US012103764B2

(12) United States Patent
Lange

(10) Patent No.: US 12,103,764 B2
(45) Date of Patent: Oct. 1, 2024

(54) ADAPTABLE TRANSPORTATION CONTAINER SYSTEMS FOR VEHICLES

(71) Applicant: Toyota Motor North America, Inc., Plano, TX (US)

(72) Inventor: Armin Lange, Addison, TX (US)

(73) Assignee: Toyota Motor North America, Inc., Plano, TX (US)

( * ) Notice: Subject to any disclaimer, the term of this patent is extended or adjusted under 35 U.S.C. 154(b) by 1104 days.

(21) Appl. No.: 16/937,880

(22) Filed: Jul. 24, 2020

(65) Prior Publication Data

US 2022/0024526 A1    Jan. 27, 2022

(51) Int. Cl.
*B65D 88/00* (2006.01)
*B62D 33/04* (2006.01)
*G01G 19/08* (2006.01)

(52) U.S. Cl.
CPC ........... *B65D 88/005* (2013.01); *B62D 33/04* (2013.01); *G01G 19/08* (2013.01)

(58) Field of Classification Search
CPC ....... B65D 88/005; B62D 33/04; G01G 19/08
USPC ......................................................... 701/49
See application file for complete search history.

(56) References Cited

U.S. PATENT DOCUMENTS

| | | | |
|---|---|---|---|
| 2018/0186208 A1* | 7/2018 | Coombs | G01G 19/10 |
| 2019/0291865 A1 | 9/2019 | O'Donnell | |
| 2020/0247423 A1* | 8/2020 | Almahmoud | G01G 19/12 |

FOREIGN PATENT DOCUMENTS

| | | | |
|---|---|---|---|
| CN | 203651944 U | 6/2014 | |
| EP | 0472141 A2 * | 2/1992 | B62D 33/04 |
| EP | 0890463 A2 | 12/2001 | |
| KR | 20160121812 A | 10/2016 | |
| WO | 200162549 A1 | 8/2001 | |
| WO | 2019145403 A1 | 8/2019 | |

* cited by examiner

*Primary Examiner* — Tiffany P Ohman
(74) *Attorney, Agent, or Firm* — Dinsmore & Shohl LLP

(57) ABSTRACT

An adjustable transportation container system is provided including a container including a plurality of container segments defining a geometry, a container adjustment device interconnecting the plurality of container segments, one or more processors, and one or more memory modules. The one or more memory modules include a computer-readable medium storing computer-readable instructions that, when executed by the one or more processors, cause the one or more processors to identify a weight distribution of the container, identify an adjusted geometry of the container, and actuate the container adjustment device to change the geometry of the container to conform to the adjusted geometry.

11 Claims, 2 Drawing Sheets

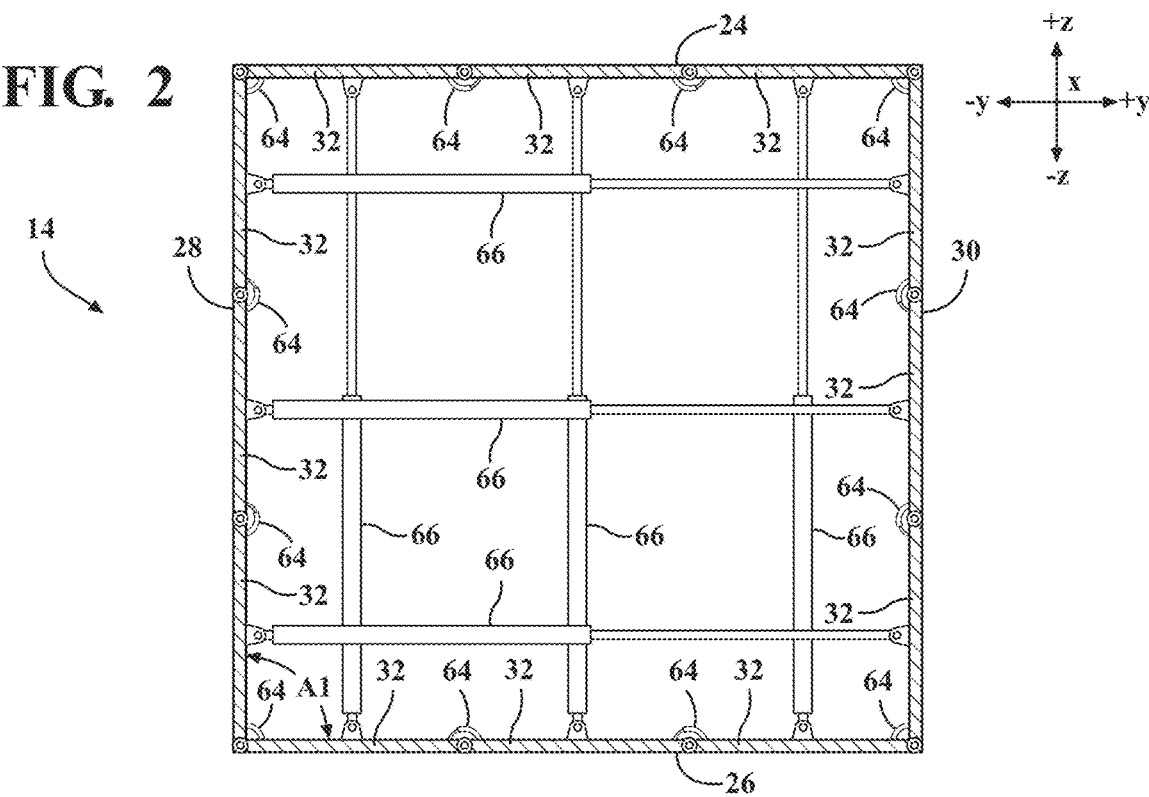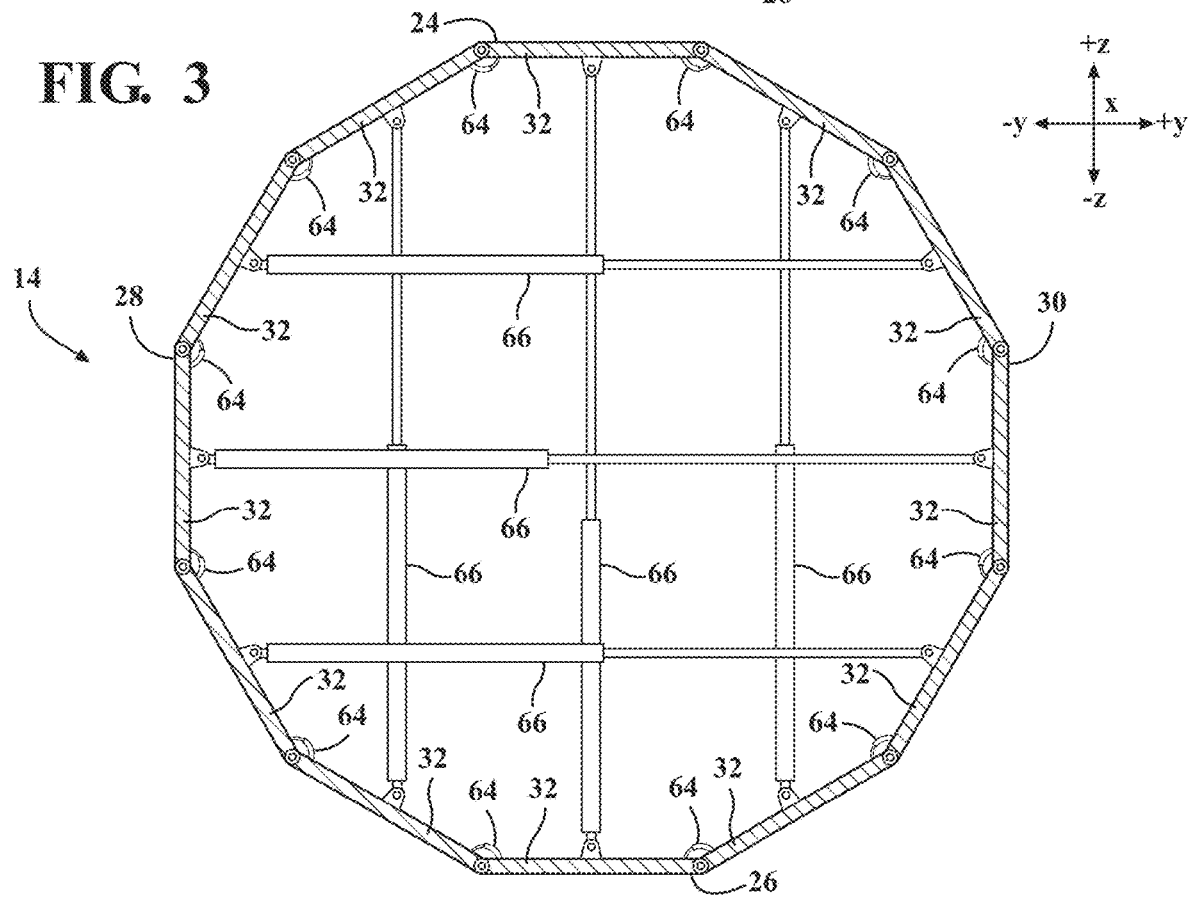

ADAPTABLE TRANSPORTATION CONTAINER SYSTEMS FOR VEHICLES

TECHNICAL FIELD

The present specification generally relates to transportation containers having a variable geometry and, more specifically, systems for adjusting a geometry of a transportation container based on a weight distribution of the transportation container.

BACKGROUND

Vehicles hauling transportation containers may exhibit undesirable driving behaviors when the container is overloaded with product being transported. This may include diminished control of the vehicle and an increased risk of the vehicle tipping over if the container is top heavy. Weight sensors may be provided within the container for determining a weight distribution of product provided within the container. However, this only allows the person loading the container to know when a limit has been reached and to stop loading the container.

A specific weight distribution may be desirable for certain driving conditions, but undesirable for other driving conditions. Additionally, a standard cross-sectional shape of the container, such as a rectangular cross-section, may be desirable for certain weight distributions, but undesirable for others.

Accordingly, a need exists for improved systems for determining a weight distribution of a container, among other factors adjusting driving conditions, and adjusting the geometry of the container based on the weight distribution of product provided in the container.

SUMMARY

In one embodiment, an adjustable transportation container system includes a container including a plurality of container segments defining a geometry, a container adjustment device interconnecting the plurality of container segments, one or more processors, and one or more memory modules. The one or more memory modules include a computer-readable medium storing computer-readable instructions that, when executed by the one or more processors, cause the one or more processors to identify a weight distribution of the container, identify an adjusted geometry of the container, and actuate the container adjustment device to change the geometry of the container to conform to the adjusted geometry.

In some embodiments, the container adjustment device includes actuators extending between adjacent container segments of the container for adjusting an angle between the adjacent container segments. In some embodiments, the container adjustment device includes actuators extending between opposing container segments for increasing and decreasing at least one of a width and a height of the container.

In some embodiments, the adjustable transportation container system includes a weight sensor for determining a weight distribution of the container and at least one of a wind sensor, a speedometer, and a weather forecast module. The adjustable transportation container system determines the adjusted geometry of the container based on the weight distribution of the container and, when provided, data provided by at least one of the wind sensor, the speedometer, and the weather forecast module.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 schematically depicts a cross-sectional view taken along line 2-2 of FIG. 1 showing the container in a first geometry; and FIG. 3 schematically depicts a cross-sectional view of the container in a second geometry according to one or more embodiments shown and described herein.

DETAILED DESCRIPTION

Figure 1:
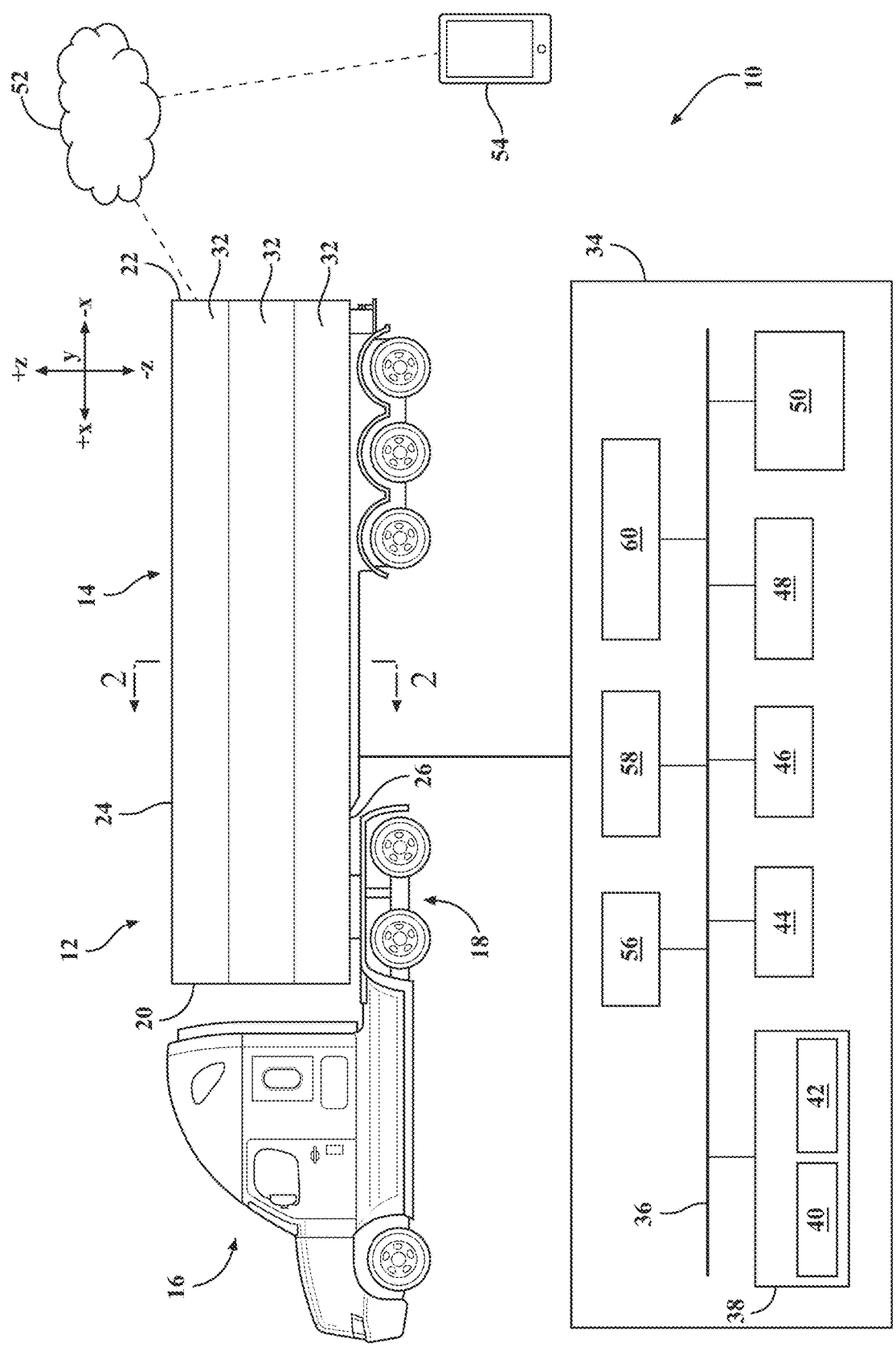
FIG. 1 schematically depicts an adaptable transportation container system for a vehicle including a container according to one or more embodiments shown and described herein.

Embodiments described herein are directed to adaptable transportation container systems for vehicles and methods for changing the geometry of containers to improve driving conditions and weight distribution within the containers.

The adaptable transportation container system includes a vehicle including a container. The container includes a plurality of container segments and a container adjustment device interconnecting the plurality of container segments. The container adjustment device is configured to adjust the geometry of the container based on a weight distribution of the container to conform to an adjusted geometry. Various embodiments of the systems and methods and the operation of the systems and methods are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/− vehicle X direction depicted in FIG. 1). The term "vehicle lateral direction" refers to the cross-vehicle direction (i.e., in the +/− vehicle Y direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring now to FIG. 1, an adaptable transportation container system 10 is illustrated according to one or more embodiments described herein. The adaptable transportation container system 10 may generally include a vehicle 12 including a container 14 for storing and transporting product(s). As illustrated herein, the vehicle 12 is depicted as a truck hauling the container 14 at a rear of the truck. However, it should be appreciated that the present disclosure is equally applicable to other types of vehicles and containers such as, for example, a sedan hauling a much smaller container. Although the present disclosure refers to the adaptable transportation container system 10 including a vehicle 12 hauling the container 14, it should be appreciated that the container may be utilized apart the vehicle such as, for example, prior to vehicle operation and transportation of the container without departing from the scope of the present disclosure.

In the embodiment illustrated, the vehicle 12 includes a cabin 16 and a body 18, which is coupled to the container 14. The container 14 includes a front end 20, an opposite rear end 22, a top wall 24, a bottom wall 26, and a pair of side walls 28, 30 (See FIG. 2). As discussed in more detail herein, the top wall 24, the bottom wall 26, and the pair of side walls 28, 30 each include a plurality of container segments 32. As shown, the top wall 24, the bottom wall 26, and the pair of side walls 28, 30 each include three container segments 32. However, any number of container segments 32 may be provided.

Opposite ends of the container segments 32 may be fixed or hingedly attached to one another by any suitable rotatable mechanism such as, for example, joints, hinges, and the like, such that the container segments 32 are pivotable relative to one another. As described in more detail herein, the container segments 32 are actuated to adjust the geometry of the container 14. As used herein, the term "geometry" when referring to the container 14 refers to a cross-sectional geometry of the container 14 when viewed in the vehicle longitudinal direction. In some embodiments, the front end 20 and the rear end 22 of the container 14 are formed from a flexible or elastic material to account for changes in the geometry of the container 14 while keeping the front end 20 and the rear end 22 of the container 14 closed.

As shown in FIG. 1, in some embodiments, the adaptable transportation container system 10 includes an onboard computing device 34 including a communication path 36, an electronic control unit 38 including a processor 40 and a memory module 42, input/output hardware 44, a container adjustment device 46, a weight sensor 48, network interface hardware 50, a wind sensor 56, a speedometer 58, and a weather forecast module 60. As noted above, the container 14 may be utilized apart from the vehicle 12. It should be appreciated that the onboard computing device 34 may be integrated within or in communication with either the vehicle 12 or the container 14. However, as discussed herein, the components of the onboard computing device 34 may be referred to as being part of the vehicle 12 without limiting the scope of the present disclosure. As noted above, when the onboard computing device 34 is part of the container 14, the container 14 may be utilized without the vehicle 12 present. The various components and the interaction thereof will be described in detail below.

In some embodiments, a network 52 couples the vehicle 12 to a mobile computing device 54. The network 52 may include a wide area network, such as an internet or cellular network (such as 3G, 4G, 4G LTE, WiMAX, etc.). Similarly, the network 52 may include a local area network, such as a wireless fidelity (Wi-Fi) network, a Bluetooth network, a near field communication network, hardware, and the like.

The mobile computing device 54 may be configured as a mobile phone, a tablet, a personal computer, and/or other devices for performing the functionality described herein. The mobile computing device 54 may be operated by a third party such as a driver or other occupant or owner of the vehicle 12.

The communication path 36 may be formed from any medium that is capable of transmitting a signal such as, for example, conductive wires, conductive traces, optical waveguides, or the like. Moreover, the communication path 36 may be formed from a combination of mediums capable of transmitting signals. In one embodiment, the communication path 36 comprises a combination of conductive traces, conductive wires, connectors, and buses that cooperate to permit the transmission of electrical data signals to components such as processors, memories, sensors, input devices, output devices, and communication devices. Accordingly, the communication path 36 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 36 communicatively couples the various components of the vehicle 12. As used herein, the term "communicatively coupled" means that coupled components are capable of exchanging data signals with one another such as, for example, electrical signals via conductive medium, electromagnetic signals via air, optical signals via optical waveguides, and the like.

The processor 40 of the electronic control unit 38 may be any device capable of executing machine-readable instructions. Accordingly, the processor 40 may be a controller, an integrated circuit, a microchip, a computer, or any other computing device. The processor 40 may be communicatively coupled to the other components of the vehicle 12 by the communication path 36. Accordingly, the communication path 36 may communicatively couple any number of processors with one another, and allow the components coupled to the communication path 36 to operate in a distributed computing environment. Specifically, each of the components may operate as a node that may send and/or receive data. While the embodiment depicted in FIG. 1 includes a single processor 40, other embodiments may include more than one processor.

The memory module 42 of the electronic control unit 38 is coupled to the communication path 36 and communicatively coupled to the processor 40. The memory module 42 may comprise RAM, ROM, flash memories, hard drives, or any non-transitory memory device capable of storing machine-readable instructions such that the machine-readable instructions can be accessed and executed by the processor 40. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 42. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 42, other embodiments may include more than one memory module.

The input/output hardware 44 is coupled to the communication path 36 and communicatively coupled to the processor 40. The input/output hardware 44 may refer to a basic input/output system (BIOS) that interacts with hardware of the vehicle 12, the container 14, the mobile computing device 54, drivers that interact with particular devices of the vehicle 12, the container 14, or the mobile computing device 54, one or more operating systems, user applications, background services, background applications, etc. In some embodiments, the input/output hardware 44 includes a display unit, a user interface, and/or the other hardware in the vehicle 12. The user interface may include manual buttons or touchscreen controls provided on the display unit.

The weight sensor 48 is coupled to the communication path 36 and communicatively coupled to the processor 40. The weight sensor 48 is configured to identify a weight distribution within an interior of the container 14. The weight sensor 48 may include, for example, a strain gauge, a capacitance sensor, a hydraulic sensor, or a pneumatic sensor. The weight sensor 48 may include a single weight sensor device provided on or within a bottom floor of the container, or may include a plurality of interconnected weight sensor devices positioned throughout the bottom floor of the container 14. The weight sensor 48 is configured to identify a weight distribution of the container 14 in at least one of the vehicle longitudinal direction (+/− vehicle X direction) and the vehicle lateral direction (+/− vehicle Y direction).

The container adjustment device 46 is coupled to the communication path 36 and communicatively coupled to the processor 40. The container adjustment device 46, described in more detail herein, comprises a plurality of adjustable members such as, for example, actuators, telescoping frames, threaded rods, and the like. The container adjustment device 46 receives instruction from the processor 40 to actuate or otherwise operate, thereby adjusting the geometry of the container 14.

The network interface hardware 50 is coupled to the communication path 36 and communicatively coupled to the processor 40. The network interface hardware 50 may include or be configured to interface with a transceiver to connect the vehicle 12 or the container 14 to the network 52. As an example, the network interface hardware 50 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication may be made through the network interface hardware 50 thereby facilitating communication between the electronic control unit 38 and the mobile computing device 54 through the network 52.

In some embodiments, the onboard computing device 34 includes a wind sensor 56 coupled to the communication path 36 and communicatively coupled to the processor 40. The wind sensor 56 may be an anemometer for determining a wind speed across the vehicle 12 and/or the container 14 such as, for example, a rotational anemometer, a thermal flow anemometer, a pressure tube anemometer, an ultrasonic anemometer, and a laser Doppler anemometer.

In some embodiments, the onboard computing device 34 may include a speedometer 58 coupled to the communication path 36 and communicatively coupled to the processor 40. The speedometer 58 may be utilized in combination with the weight sensor 48 and the wind sensor 56, as discussed in more detail herein, to identify the weight distribution of the container 14 and assist in identifying an adjusted geometry of the container 14.

In some embodiments, the onboard computing device 34 may include a weather forecast module 60 coupled to the communication path 36 and communicatively coupled to the processor 40. The weather forecast module 60 may be coupled to the network 52 via the network interface hardware 50 for retrieving weather forecast data from a third-party source. The weather forecast module 60 may be utilized to modify the identified adjusted geometry of the container 14 based on data identifying upcoming changes in weather conditions.

Referring now to FIG. 2, a cross-sectional view of the container 14 is shown in a first geometry. The first geometry may be an initial or default geometry in which the container 14 is configured at the outset. As shown, the first geometry resembles a square or rectangular geometry. However, the first geometry is only shown for illustrative purposes and other geometries are considered within the scope of the present disclosure.

In some embodiments, the container adjustment device 46 includes a plurality of short actuators 64 interconnecting adjacent container segments 32. As shown, a short actuator 64 is provided between each pair of adjacent container segments 32. In some embodiments, opposite ends of the short actuators 64 are pivotally coupled to a respective container segment 32. However, some embodiments may include a fewer number of short actuators 64. The short actuators 64 may be linear actuators, threaded rods, rack and pinion gears, pneumatic actuators, or the like. The short actuators 64 are operable between an extended position and a retracted position to adjust an angle between adjacent container segments 32. Thus, as one of the short actuators 64 are moved toward the extended position, the angle between the adjacent container segments 32 interconnected by the short actuator 64 is increased.

For example, a short actuator 64 interconnecting a container segment 32 of the side wall 28 and a container segment 32 of the bottom wall 26 defines an angle A1 therebetween. As shown, the angle A1 is approximately 90 degrees to orient the container segment 32 of the side wall 28 and the container segment 32 of the bottom wall 26 substantially perpendicular to one another. When actuated, the short actuator 64 may be moved toward the extended position or the retracted position as necessary to increase or decrease the angle A1, respectively. In some embodiments, the short actuator 64 may be moved toward the extended position such that the angle A1 between the container segments 32 is greater than 90 degrees, for example, 180 degrees, as shown between other adjacent container segments 32, and may be moved toward the retracted position such that the angle A1 between the container segments 32 is less than 90 degrees.

In some embodiments, the container adjustment device 46 includes a plurality of long actuators 66 extending between opposing container segments 32. For example, three long actuators 66 are shown extending vertically from container segments 32 of the top wall 24 to respective container segments 32 of the bottom wall 26. Similarly, three long actuators 66 are shown extending horizontally from the container segments 32 of one side wall 28 to respective container segments 32 of the other side wall 30. However, it is to be appreciated that, in some embodiments, there may be more or less long actuators 66 extending between the top wall 24 and the bottom wall 26, as well as more or less long actuators 66 extending between the side walls 28, 30. The long actuators 66 may be provided proximate the front end 20 of the container 14, the rear end 22 of the container 14, or any other suitable location in the vehicle longitudinal direction. In some embodiments, the container adjustment device 46 may include long actuators 66 provided at both the front end 20 and the rear end 22 of the container 14 for added support.

The long actuators 66 may be linear actuators, threaded rods, rack and pinion gears, pneumatic actuators, or the like. The long actuators 66 are operable between an extended position and a retracted position to adjust a distance between opposing container segments 32. Thus, as one of the long actuators 66 are moved toward the extended position, the distance between the opposing container segments 32 interconnected by the long actuator 66 is increased. Similarly, when one of the long actuators 66 is moved toward the retracted position, the distance between the opposing container segments 32 interconnected by the long actuator 66 is decreased. This may be suitable for adjusting the dimensions of the container 14 in the vehicle lateral direction and/or the vehicle vertical direction. The long actuators 66 may be pivotally coupled to the container segments 32 such that the container segments 32 can rotate relative to the long actuators 66 when the long actuators 66 do not move in unison or move by different amounts.

As shown in FIG. 3, the container 14 is illustrated in a second geometry substantially resembling that of a circle. When adjusting the geometry of the container 14 from the rectangular geometry shown in FIG. 2 to the substantially circular geometry shown in FIG. 3, it should be appreciated that some of the short actuators 64 are moved toward the extended position to increase the angle between adjacent, previously collinear container segments 32 while other short actuators 64 are moved toward the retracted position to decrease the angle between adjacent, previously perpendicular container segments 32.

In embodiments in which the long actuators 66 are provided, the long actuators 66 are moved toward the extended position or the retracted position based on their position relative to a central location. For example, the outermost long actuators 66 extending vertically and the outermost long actuators 66 extending horizontally may be moved toward the retracted position while to provide the substantially circular geometry shown in FIG. 3. Alternatively, or in combination therewith, the innermost long actuator 66 extending vertically and the innermost long actuator 66 extending horizontally may be moved toward the extended position to provide the substantially circular geometry.

It should be appreciated that the container adjustment device 46 may include one or any combination of the embodiments discussed herein. For example, the container adjustment device 46 may include the short actuators 64 and the long actuators 66, as shown, or may include only one of the above. As such, the container adjustment device 46 may be utilized to adjust the geometry of the container 14 to any suitable geometry, such as square, rectangular having various dimensions in the vehicle lateral direction and the vehicle vertical direction, circular or substantially circular, triangular, and the like. In addition, the present disclosure determines an adjusted geometry of the container based on any one or a combination of parameters including, but not limited to, weight distribution, wind speed/direction, vehicle speed, weather forecast data, and the like.

As discussed above, the onboard computing device 34 includes at least one weight sensor 48 provided on or within the bottom wall 26 of the container 14. The weight sensor 48 is configured to determine the weight distribution within the container 14 based on the weight and location of product within the container 14. Specifically, the weight sensor 48 may determine the weight distribution of the container 14 in at least one of the vehicle longitudinal direction and the vehicle lateral direction. For example, the weight sensor 48 may determine that most of the weight within the container 14 is located proximate the front end 20 and/or the rear end 22, as well as proximate one or both of the side walls 28, 30 of the container 14. The electronic control unit 38 processes the weight distribution identified by the weight sensor 48 to determine an adjusted geometry for the container 14. The adjusted geometry may be determined based on the weight distribution in a number of ways to minimize movement of the contents of the container, to improve fuel economy, to enhance aerodynamic properties of the container, and the like. Based on the determined adjusted geometry, the container adjustment device 46 is actuated to conform the geometry of the container 14 to the determined adjusted geometry in the manner discussed above. This may be done prior to the vehicle 12 being driven or during operation of the vehicle 12.

As noted above, the onboard computing device 34 may also include the wind sensor 56, the speedometer 58, and the weather forecast module 60. The determination of the adjusted geometry of the container 14 may be affected based on one or more of the wind speed, wind direction, speed of the vehicle 12, and weather forecast. The adjusted geometry may be determined based on the wind, speed, and weather forecast in a number of ways to minimize movement of the contents of the container, to improve fuel economy, to enhance aerodynamic properties of the container, and the like. In a non-limiting example, it may be determined that under certain circumstances, such as high winds speeds, high vehicle speeds, and/or uneven weight distribution within the container 14, a circular or substantially circular geometry may be the adjusted geometry given its aerodynamic performance. As another non-limiting example, it may be determined that under other circumstances, such as low wind speeds, low vehicle speeds, and/or even weight distribution within the container, a square geometry may be the adjusted geometry given its even distribution in the vehicle lateral direction and the vehicle vertical direction. The weather forecast module may be suitable for supplementing the wind speed and/or direction information based on a predicted change while the container 14 is in use.

In some embodiments, the parameters for determining the adjusted geometry for the container 14 may be automatically set to predetermined thresholds. The thresholds may be selected and/or adjusted by a user based user-specific, vehicle-specific, or container-specific needs via the input/output hardware 44, the mobile computing device 54, or any other suitable user interface in communication with the adaptable transportation container system 10. For example, if wind speeds, vehicle speeds, and/or weight distribution of the container 14 exceed a predetermined threshold, the container 14 may be configured to a first geometry optimal for those specific parameters. Alternatively, if wind speeds, vehicle speeds, and/or weight distribution of the container 14 do not exceed a predetermined threshold, the container 14 may be configured to a second geometry optimal for those specific parameters. It should be appreciated that the container 14 may be selectively configured into more than the first and second geometries based on the specific parameters. A formula, machine learning algorithm, or trained artificial neural network may be utilized for determining which geometry is optimal for the container 14 given the specific parameters.

From the above, it is to be appreciated that defined herein is a adaptable transportation container for determining a weight distribution of a container, among other factors adjusting driving conditions such as, for example, wind speed/direction, vehicle speed, and weather forecast predictions, and adjusting the geometry of the container based on the weight distribution of product provided in the container It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An adjustable transportation container system comprising:
   a container including a plurality of container segments defining a geometry;
   a container adjustment device interconnecting the plurality of container segments;
   one or more processors; and
   one or more memory modules comprising a computer-readable medium storing computer-readable instructions that, when executed by the one or more processors, cause the one or more processors to:
   identify a weight distribution of the container;
   identify an adjusted geometry of the container based on the weight distribution of the container; and
   actuate the container adjustment device to change the geometry of the container to conform to the adjusted geometry,
   wherein the adjusted geometry defines a cross-sectional shape of the container.

2. The adjustable transportation container system of claim 1, wherein the container adjustment device comprises a plurality of actuators.

3. The adjustable transportation container system of claim 2, wherein the plurality of actuators extend between adjacent container segments of the container.

4. The adjustable transportation container system of claim 3, wherein the adjacent container segments are rotatably attached to one another and the plurality of actuators are configured to operate between an extended position and a retracted position to rotate the adjacent container segments relative to one another.

5. The adjustable transportation container system of claim 2, wherein the plurality of actuators extend between opposing container segments of the container.

6. The adjustable transportation container system of claim 5, wherein the plurality of actuators are configured to operate between an extended position and a retracted position to adjust a distance between opposing container segments of the container.

7. The adjustable transportation container system of claim 1, wherein the adjusted geometry has a circular geometry.

8. The adjustable transportation container system of claim 1, further comprising a weight sensor configured to determine the weight distribution of the container.

9. The adjustable transportation container system of claim 1, further comprising a wind sensor, the adjusted geometry of the container based on data transmitted from the wind sensor.

10. The adjustable transportation container system of claim 1, further comprising a weather forecast module, the adjusted geometry of the container based on data transmitted from the weather forecast module.

11. The adjustable transportation container system of claim 1, further comprising a speedometer, the adjusted geometry of the container based on data transmitted from the speedometer.

* * * * *